United States Patent [19]

Boffelli

[11] Patent Number: 4,704,926
[45] Date of Patent: Nov. 10, 1987

[54] TURRET FOR AN AUTOMATIC LATHE
[75] Inventor: Pier C. Boffelli, Milan, Italy
[73] Assignee: Baruffaldi Frizioni S.p.A., Milan, Italy
[21] Appl. No.: 902,482
[22] Filed: Sep. 2, 1986
[30] Foreign Application Priority Data
  Sep. 11, 1985 [IT] Italy .................. 22979/85[U]
[51] Int. Cl.⁴ .............................................. B23B 29/32
[52] U.S. Cl. ............................... 82/36 A; 29/40; 408/35
[58] Field of Search ............ 82/36 A; 408/35; 29/27 R, 27 C, 36, 39, 40, 48.5 R, 48.5 A, 49; 74/813 R, 813 L, 813 C, 816, 817, 825, 826

[56] References Cited
U.S. PATENT DOCUMENTS
  1,505,131  8/1924  Buschmann .................. 408/35
  3,449,985  6/1969  Eaves et al. .................. 29/40
  3,717,417  2/1973  Aubrier ....................... 29/40

FOREIGN PATENT DOCUMENTS
   34202  2/1985  Japan ..................... 82/36 A
  864687  1/1984  U.S.S.R. ................. 82/36 A Primary Examiner—Nicholas P. Godici
Assistant Examiner—Jerry Kearns
Attorney, Agent, or Firm—Karl F. Ross; Herbert Dubno

[57] ABSTRACT

A turret for an automatic lathe has a coupling sleeve connected with the driven shafts at each of a plurality of tool stations and actuated by a plunger displaceable parallel to the turret axis to couple the sleeve with the driven shaft when the tool is positioned at the working location. All of the driven shafts are continuously rotated by gearing connecting the driven shafts with the drive shaft extending along the axis of the turret.

14 Claims, 3 Drawing Figures

TURRET FOR AN AUTOMATIC LATHE

FIELD OF THE INVENTION

The present invention relates to a turret for an automatic lathe and, more particularly, to a rotatable or indexable turret which can dispose a plurality of tools at a working position and which is equipped with means for rotating at least some of the tools about respective axes which can be radial with respect to the turret axis.

More particularly, the invention relates to a device for the rotation of the radial tools in a predetermined position of a turret of an automatic lathe which itself is rotatable about a turret axis and can be indexed to orient such tools in succession in a working position.

BACKGROUND OF THE INVENTION

An automatic lathe comprises, in addition to a headstock which rotates the workpiece and a tailstock which can support the workpiece for such rotation, a tool-carrying mechanism which can be in the form of a turret provided with a plurality of spaced-apart tool-carrying stations at each of which a respective tool can be positioned vis-a-vis the workpiece by rotation of the turret about a turret axis, manually or automatically in accordance with a predetermined program for successive oerations of the tools on the workpiece and in a cycle through which the turret can be rotated.

Many of the tools carried by the turret are fixed on the turret body, but for certain kinds of operations on the workpiece it is convenient to have rotatable tools mounted on the same turret, i.e. tools which can be rotated around their axis, in order to make operations like milling, drilling, boring, threading and the like. Without such kind of rotatable tools, for these operations it is necessary to remove the workpiece from the lathe and mount it on another machine.

In order to avoid this extra handling of the workpiece it has been proposed to provide turrets carrying some tools which can be driven in rotation to make the cited operations.

For this purpose turrets are known which are equipped with external drive mechanisms to rotate the tools, but these systems occupy considerable space and are generally of complex structure. Because of the space occupied by such external drives, difficulties may be encountered in locating the tool with respect to the workpiece.

In another kind of turret a common drive is provided for all of the rotatable tools; these turrets drive contemporarily all the rotatable tools, and not only the one in working position on the workpiece.

These turrets have the drawback that additional protective device must be provided in order to prevent accidental contact of the operator with the rotating tools which are not in contact with the piece, thereby forming an additional encumbrance.

OBJECTS OF THE INVENTION

It is the principal object of the present invention to provide a device for the selective rotation of the tools of a turret which will allow only the rotation of a tool in the working position of the turret while permitting other rotatable tools thereof to remain undriven although a common drive source is provided for all the tools.

Another object of the invention is to provide a turret of the type described which permits drive of one or more tools thereof and which has little encumbrance and basically a simple construction so that maintenance is not a problem and reliability is ensured.

Still another object of the invention is to provide an improved turret for an automatic lathe which eliminates the drawbacks of the earlier devices described.

SUMMARY OF THE INVENTION

These objects and others which will become apparent hereinafter, are attained in a turret for an automatic lathe which comprises on the turret body at a plurality of positions angularly spaced about the axis of rotation of the turret body hereinafter referred to as the turret axis, a plurality of rotatable tools or mounts for a plurality of rotatable tools.

A primary shaft extending along the axis and connected by gearing, e.g. bevel gearing, with secondary shafts assigned to each tool and extending along the radial tool axis of the respective tool. A coupling element, e.g. a sleeve, is keyed to each secondary shaft and forms a jaw clutch with formations of the tool, the coupling element being displaceable toward and away from the tool along the radial axis by a piston or plunger which is shiftable on the turret body in a direction parallel to the turret axis. The mechanism coupling the motion of the plunger with the coupling sleeve can be any mechanical transmission capable of transferring rectilinear movement in one direction at a right angle to the first direction.

More particularly, the invention comprises:
a turret for an automatic lathe, comprising:
a fixed member;
a rotatable tool-carrying body mounted on the fixed member for rotation about a turret axis, the body being formed with a plurality of locations angularly spaced about the axis at which respective tools can be mounted on the body, at least some of the tools being rotatable about respective tool axes lying radially of the turret axis;
a drive shaft extending along the turret axis into the body;
respective driven shafts extending along the tool axes perpendicular to the drive shaft and journaled in the body;
gearing in the body coupling each of the driven shafts with the drive shaft for common rotation of all the driven shafts by the drive shaft;
a respective coupling element rotatably entrained by each of the driven shafts and axially shiftable relatively thereto along a respective tool axis between a disengaged position wherein the element is decoupled from a respective tool and can rotate freely independently of the respective tool and an engaged position wherein the coupling element is engaged with the respective tool to drive the same;
a respective plunger for each of the driven shafts displaceable in the body in a direction parallel to the turret axis;
means coupling each plunger with the respective coupling element for shifting each coupling element between the disengaged position and the engaged position; and
means on the fixed member cooperating with the respective plunger when the body is rotated about the turret axis to bring the respective tool into a working position of the lathe to shift the respective coupling element into its engaged position and thereby drive the tool in the working position whereas all of the other tools remain undriven because the respective coupling elements are in the respective disengaged position.

The means coupling each plunger with the respective coupling element can comprise a pair of relatively displaceable members having wedging formations, one of the relatively displaceable members being connected to the respective plunger, the other of the relatively displaceable members acting upon the respective coupling element.

The other of the relatively displaceable members can be a thrust ring coaxial with the coupling element and translationally acting thereon, the one of the relatively displaceable members being another ring, the rings having complementary inclined surfaces forming the wedging formations.

As noted, the mechanical transmission can be made up of two elements with slanted surfaces in mutual contact and forming a wedge arrangement.

One of the wedging members may be the thrust ring which is axially shiftable in the direction of displacement of the coupling sleeve and can act thereon via a thrust bearing and a resilient member or an elastically yieldable member such as a spring in a translatory sense.

The other wedge element can be a ring transvesed by the secondary shaft whose inclined surface forms an angle with the axis of this shaft which is other than 90°, and which is coupled to the aforementioned plunger.

Of course, the mechanical transmission can consist of other conventional direction-change motion transmitting elements, such as levers, cams or desmodromic displacement devices.

The contact element on the fixed member with respect to which the body of the turret rotation can be a projection extending toward this body which causes the respective plunger to turn in a direction parallel to the turret axis which the associated tool station is indexed at the working position at which the projection is disposed.

The coupling element or sleeve can be splined to the respective radial shaft and can be acted upon by another spring with a spring force less than that at which the bearing and the thrust ring act thereon, this further spring functioning to bias the coupling sleeve away from the clutch element of the tool with which it is engagable.

BRIEF DESCRIPTION OF THE DRAWING

The above and other objects, features and advantages of the present invention will become more readily apparent hereinafter, reference being made to the accompanying drawing, in which.

SPECIFIC DESCRIPTION

Figure 1:
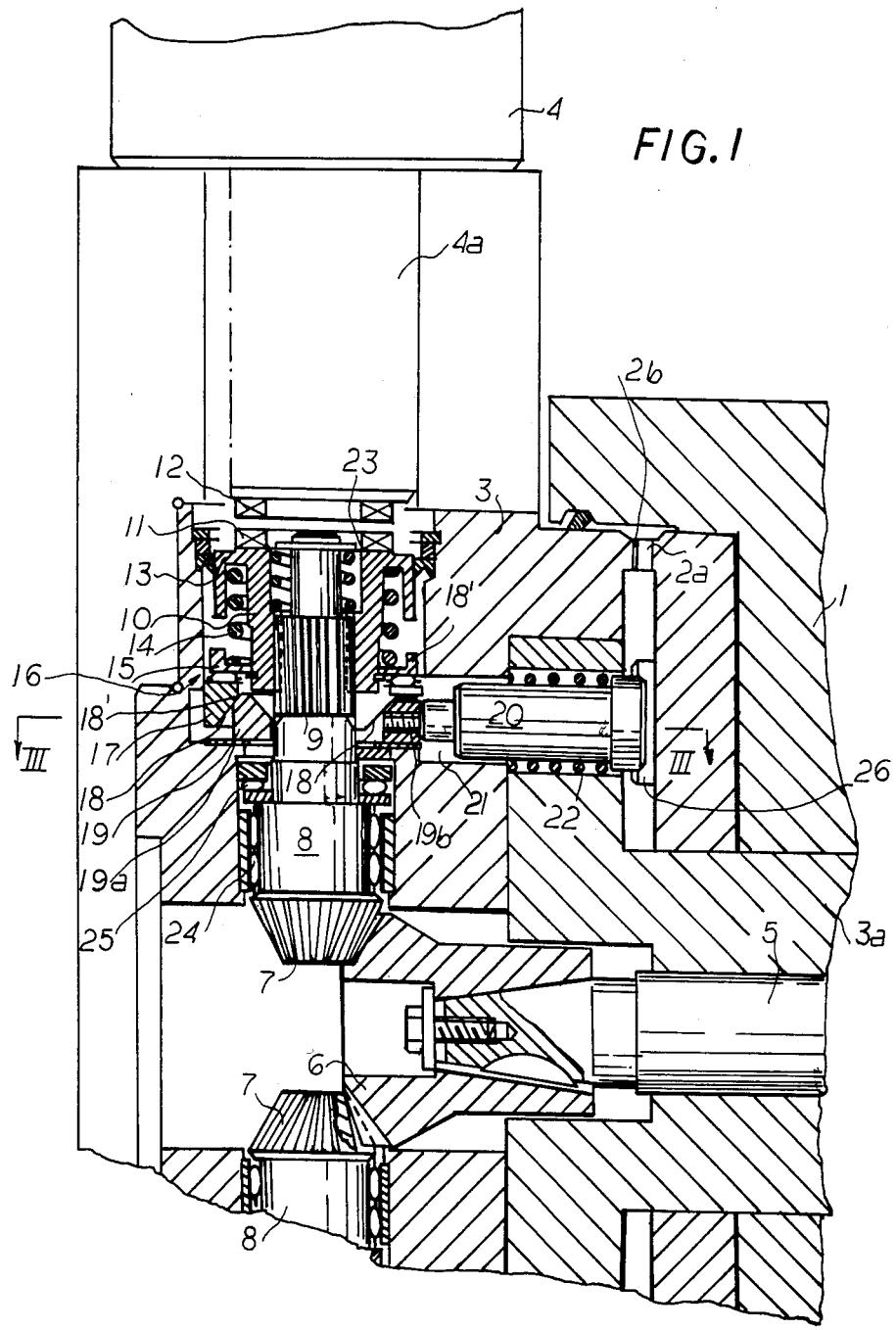
FIG. 1 is an axial section through a turret according to the invention showing the coupling element disengaged from the tool.

A turret for lathes, partially shown in the drawings, comprises a fixed element 1 carrying a front gear 2a, for its angular hold in fixed positions, engageable with a corresponding front gear 2b carried by the rotating plate or body 3 of the turret, on which a number of tools is mounted, angularly spaced on its periphery.

The rotating plate or body 3 can be moved axially to disengage the front gear 2b from the front gear 2a, rotated, arrested in a new position and moved axially in the opposite direction to engage again the gears 2a, 2b, in order to be firmly locked in its new position, corresponding to the placing of a new tool in engagement position on the workpiece. These movements are transmitted to the body by means of a driving shaft 3a, connected to the rotation apparatus of the turret. These apparatuses are well known in the art, and are not described in detail. Examples of rotation apparatuses for turrets are described in U.S. Pat. No. 4,422,352, or in U.S. patent application Ser. No. 396,868 of the same applicant.

According to the present invention, the tools on the turret body can comprise fixed tools as well as rotating tools, one of such rotating tool 4 being shown in the drawings, the turret being provided with respective stations or holders 4a for the rotatable tools; the holders for the fixed tools can be of known type and are not shown in the drawings.

The tools are disposed radially with respect to the turret axis A which is the rotation axis of the plate or body 3.

The tools are rotated by connecting them in the manner which will be described to a drive shaft 5 extending along the rotation axis A of the plate and driven by a motor (not shown) of the lathe.

Where the shaft 5, hereinafter the primary or drive shaft, extends into the turret, it is locked to a bevel gear 6 which engages the bevel gear 7 of each of a plurality of secondary shafts 8 extending radially at each of the rotating tool positions and referred to hereinafter also as the driven shafts.

Each of the driven shafts 8 is splined at 9 and thereby keyed to a coupling element or sleeve 10 which is axially shiftable along the respective driven shaft.

At its end turned away from the driven shaft 5, each sleeve 10 is provided with clutch teeth 11 engagable with the clutch teeth 12 of the tool assembly 4, 4a, and is formed with a flange 13 against which a compression spring 14 is seated.

The compression spring 14 of each sleeve 10 is also braced against one brace 15 of a thrust bearing 16 axially shiftable along the respective shaft 8.

The other brace of the thrust bearing 16 can be formed by a thrust ring 17 surrounding the shaft 8 and provided with bevelled or inclined surfaces 18 which includes an angle for the axis of the shaft 8 other than 90°. The inclined surface 18 cooperates with inclined surfaces 18' of another ring 19 which is coupled by a screw 19b to a plunger 20. The plunger or piston 20, sliding in a bore of the rotating plate or body 3 thus is displaceable parallel to the axis A, i.e. the turret axis, against the force of a spring 22 which presses the piston or plunger toward the fixed element 1 of the turret.

A spring 23 is braced between a disk 8a at the end of the shaft 8 and the sleeve 10 and biases the sleeve 10 out of engagement with the tool, maintaining the ring 17 pressed against the rings 19.

Bearings 24 and 25 journal the driven shaft 8 in the plate.

Figure 2:
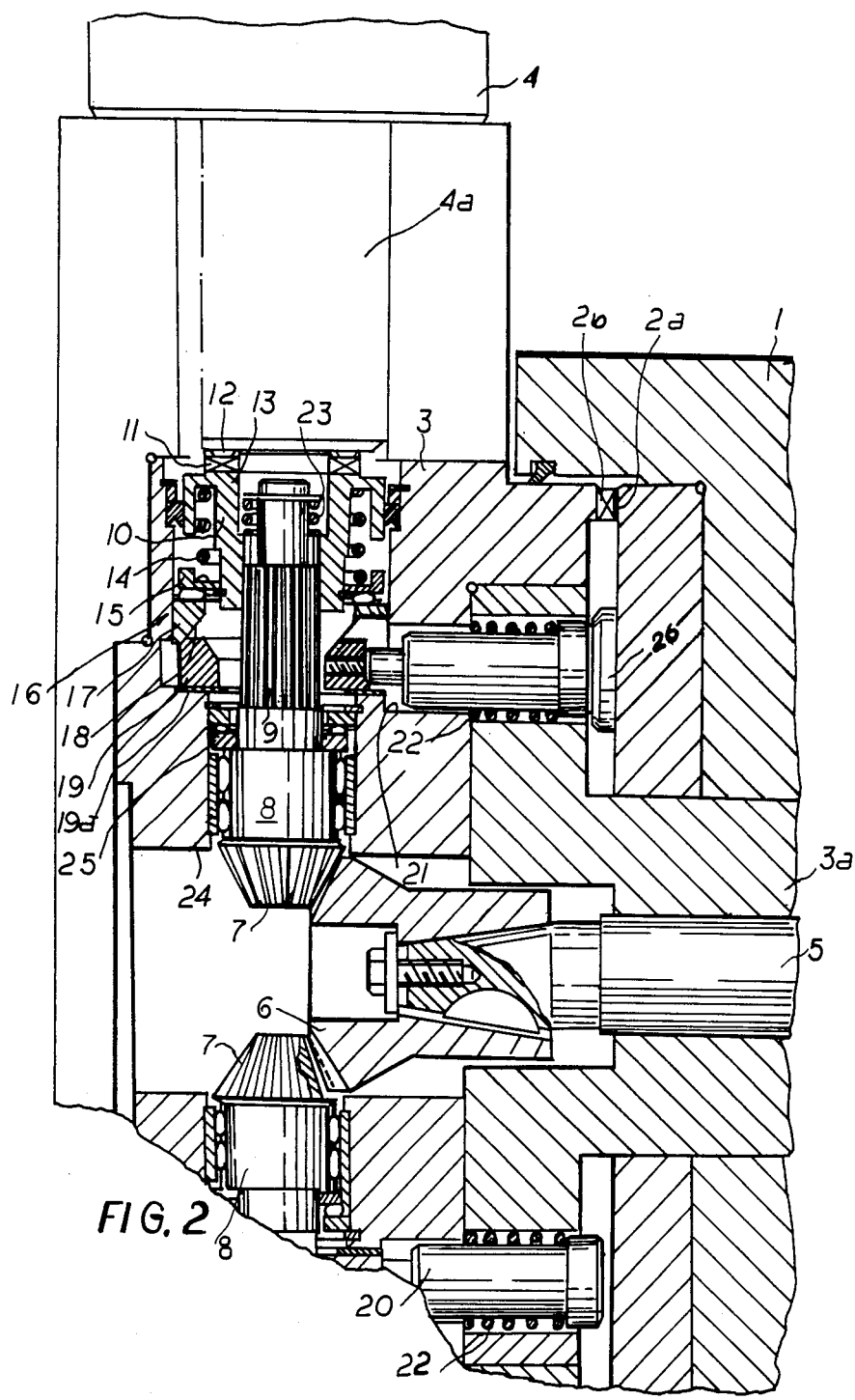
FIG. 2 is a view similar to FIG. 1 but showing the coupling element engaged with the tool.
Figure 3:
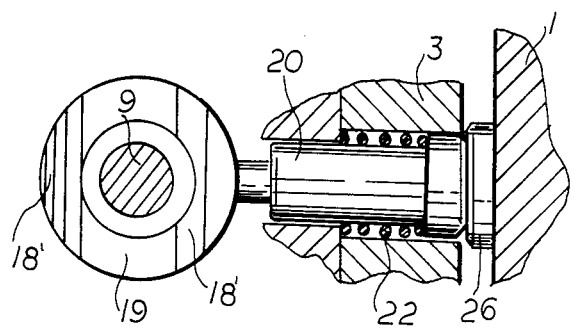
FIG. 3 is a cross sectional view taken along the line III—III of FIG. 1.

In correspondence to the working position of a tool on the workpiece the fixed element 1 carries a projection 26 (see FIG. 2).

When a rotatable tool is swung into the working position by the rotation of the turret body 3, during the axial movement of the body 3 to place into engagement the front gears 2a, 2b, the plunger or piston 20 hits against the projection 26 (FIG. 2), thereby displacing the ring 19 to the left of the figure and carrying the ring 17 upwardly so that the force generated by the spring 19 in the upward direction on the sleeve 10 exceeds the force of the spring 23 and the clutch teeth are brought into engagement with the tool teeth 12 to drive the tool.

When, however, the turret is swung to permit the plunger 20 to drop back into its inactive position, the spring 22 carries the ring 19 to shift to the right and allow the springs 23 and 14 to retract the sleeve from the tool and disengage the coupling. Thus when the tool is not located at its working position, it is disengaged from the shaft 8 and is not driven. The springs 14 and 23 elastically absorb vibration and the like to prevent inadvertent or undesired engagement of the clutch teeth 11 and 12.

The inclined surfaces 18 and 18' form preferably angles of about 45° with the axis of the shaft 10 where the displacement of the sleeve 10 is to be equal to the displacement of the piston of the piston or plunger 20 although other angles can be used depending upon the stresses or displacements which must be taken into consideration.

It will be understood, that other means may be provided for coupling the plunger 20 with the sleeve 10, including lever means, can means or other mechanical transmissions.

Other camming means which are similarly effective can be substituted for projection 26. For example the plunger 20 can extend into a recess of the fixed member 1 and can ride up a ramp or other inclined surface of this recess. In that case the dropping of the plunger in the recess can be used to actuate the sleeve 10. This latter case can be suitable when an axial displacement of the body 3 is not required to unlock for reaching its new angular position and to lock again, by means of gears 2a, 2b in this position.

What is claimed is:

1. A turret for an automatic lathe, comprising:
   a fixed member;
   a rotatable tool-carrying body mounted on said fixed member for rotation about a turret axis, said body being formed with a plurality of locations angularly spaced about said axis at which respective tools can be mounted on said body, at least some of said tools being rotatable about respective tool axes lying radially of said turret axis;
   a drive shaft extending along said turret axis into said body;
   respective driven shafts extending along said tool axes perpendicular to said drive shaft and journaled in said body;
   gearing in said body coupling each of said driven shafts with said drive shaft for common rotation of all said driven shafts by said drive shaft;
   a respective coupling element rotatably entrained by each of said driven shafts and axially shiftable relatively thereto along a respective tool axis between a disengaged position wherein said element is decoupled from a respective tool and can rotate freely independently of the respective tool and an engaged position wherein said coupling element is engaged with the respective tool to drive the same;
   a respective plunger for each of said driven shafts displaceable in said body in a direction parallel to said turret axis;
   means coupling each plunger with the respective coupling element for shifting each coupling element between said disengaged position and said engaged position; and
   means on said fixed member cooperating with the respective plunger when said body is rotated about said turret axis to bring the respective tool into a working position of the lathe to shift the respective coupling element into its engaged position and thereby drive the tool in said working position whereas all of the other tools remain undriven because the respective coupling elements are in the respective disengaged position.

2. The turret defined in claim 1 wherein said means coupling each plunger with the respective coupling element comprises a pair of relatively displaceable members having wedging formations, one of said relatively displaceable members being connected to the respective plunger, the other of said relatively displaceable members acting upon the respective coupling element.

3. The turret defined in claim 2 wherein said other of said relatively displaceable members is a thrust ring coaxial with said coupling element and translationally acting thereon, said one of said relatively displaceable members being another ring, said rings having complementary inclined surfaces forming said wedging formations.

4. The turret defined in claim 3, further comprising a thrust bearing between said thrust ring and said coupling element.

5. The turret defined in claim 4 wherein said coupling element is a sleeve and yield resilient means is provided between said bearing and said sleeve.

6. The turret defined in claim 5 wherein said yieldable resilient means is a compression spring.

7. The turret defined in claim 1 wherein said means on said fixed member is a projection cammingly engagable with each plunger when the respective tool is swung into said working position by rotation of said body about said turret axis.

8. The turret defined in claim 4 wherein said coupling element is a sleeve splined to the respective driven shaft, said turret further comprising a first spring braced between said sleeve and the respective driven shaft for biasing said sleeve away from the respective tool, said thrust ring acting upon said sleeve via a thrust bearing and a second spring of greater spring force than said first spring.

9. The turret defined in claim 4 wherein each plunger is biased by a spring into an inactive position until it is displaced by said means on said fixed member, said inactive position of each plunger corresponding to said disengaged position of the respective coupling element.

10. The turret defined in claim 6 wherein said means on said fixed member is a projection cam engagable with each plunger when the respective tool is swung into said working position by rotation of said body about said turret axis.

11. The turret defined in claim 10 wherein said sleeve is splined to the respective driven shaft, said turret further comprising a first spring braced between said sleeve and the respective driven shaft for biasing said sleeve away from the respective tool, said thrust ring acting upon said sleeve via said thrust bearing and a second spring of greater spring force than said first spring, said second spring forming said resilient means.

12. The turret defined in claim 11 wherein each plunger is biased by a spring into an inactive position until it is displaced by said means on said fixed member, said inactive position of each plunger corresponding to said disengaged position of the respective coupling element.

13. The turret defined in claim 1 wherein the means coupling each plunger with the respective coupling element includes a lever mechanism.

14. The turret defined in claim 1 wherein the means coupling each plunger with the respective coupling element includes a cam mechanism.

* * * * *